United States Patent [19]

Glasson et al.

[11] 4,133,417

[45] Jan. 9, 1979

[54] FLUID DRIVE COUPLING

[75] Inventors: Richard E. Glasson; Jerre F. Lauterbach, both of Columbus, Ind.

[73] Assignee: Cummins Engine Company, Inc., Columbus, Ind.

[21] Appl. No.: 863,995

[22] Filed: Dec. 23, 1977

[51] Int. Cl.$^2$ .............................................. F16D 35/00
[52] U.S. Cl. ................................. 192/58 B; 192/58 R; 123/41.12
[58] Field of Search ........................... 192/58 R, 58 B; 123/41.12; 60/329

[56] References Cited

U.S. PATENT DOCUMENTS

| | | | |
|---|---|---|---|
| 3,059,745 | 10/1962 | Tauschek | 192/58 B |
| 3,215,235 | 11/1965 | Kamm | 192/58 B |
| 3,262,527 | 7/1966 | Allaben | 192/58 B |
| 3,458,020 | 7/1969 | Lutz | 192/58 B |
| 3,463,282 | 8/1969 | Fujita et al. | 192/58 B |
| 3,492,975 | 2/1970 | Canoli et al. | 123/41.12 |
| 3,749,214 | 7/1973 | Leichliter | 192/58 B |

*Primary Examiner*—Edgar W. Geoghegan
*Attorney, Agent, or Firm*—Neuman, Williams, Anderson & Olson

[57] ABSTRACT

A fluid drive coupling is provided which includes a platelike first member rotatably mounted within a chamber formed in a second member, the latter also being rotatably mounted. Both members are rotatable about a common axis and one of the members is driven by an external force. The chamber is formed into an annular fluid drive section having surfaces thereof in close proximity to substantial outer opposite surface portions of the first member whereby rotation of one member imparts rotation to the other member through a fluid disposed within the chamber drive section. The chamber is also formed into an inner section, a portion of which, disposed to one side of the first member, is separated into first and second fluid reservoirs interconnected to one another only through a port. A thermal responsive valve is mounted on the second member and is rotatable therewith. The valve effects opening and closing of the port in response to predetermined temperatures. An elongated cavity is formed in the second member adjacent to and in communication with a peripheral segment of the chamber drive section. An elongated skimming means is disposed in slip fit relation within the cavity and has a portion thereof projecting into the chamber drive section and encompassing a peripheral portion of the first member. When the first member is rotating in one direction relative to the second member, the skimming means will cause removal of fluid from the surfaces of the rotating first member encompassed thereby and divert the removed fluid into the cavity whereupon the fluid will flow from the cavity into the first reservoir.

10 Claims, 7 Drawing Figures

4,133,417

FLUID DRIVE COUPLING

BACKGROUND OF THE INVENTION

Various fluid drive couplings have heretofore been provided; however, removal of the fluid from the outer peripheral surfaces of the rotating platelike member has presented various problems; for example, diverting the fluid away from the peripheral surfaces has been ineffective, caused unbalancing and excessive wear on the platelike member, and resulting in the coupling action between the rotating members being impaired. Furthermore, the prior couplings oftentimes embodied numerous components requiring an inordinate amount of maintenance and adjustment.

SUMMARY OF THE INVENTION

Thus, it is an object of the invention to provide an improved coupling which is not beset with the shortcomings associated with prior constructions.

It is a further object of the invention to provide an improved fluid drive coupling wherein the coupling and decoupling actions are readily responsive to predetermined temperature conditions encountered by the engine in which the coupling is mounted.

It is a still further object to provide a coupling embodying a novel skimming means which is adapted to readily compensate for any axial relative movement between the rotating platelike member and the second member encompassing same.

Further and additional objects will appear from the description, accompanying drawings and appended claims.

In accordance with one embodiment of the invention a fluid drive coupling is provided which is particularly suitable for use with the cooling fan of an engine or the like. The coupling includes a rotary mounted platelike first member and a rotary mounted second member, the latter being provided with a chamber in which the first member is rotatably disposed. Fan means disposed externally of the second member is connected to the first member and rotates therewith. The chamber is formed into an outer fluid drive section and an inner section. A portion of the chamber inner section disposed axially to one side of the first member is formed into first and second fluid reservoirs interconnected to one another only through a port. The second reservoir and the drive section of the chamber are in continuous communication with one another. The sides of the second member, defining the chamber drive section, are disposed in close proximity to substantial outer opposite side surfaces of the first member. The second member is provided with an elongated cavity in communication with a peripheral segment of the drive section of the chamber. The cavity is also in communication with the first fluid reservoir. Disposed in slip fit relation within the cavity is an elongated skimming means having a portion thereof projecting into the drive section of the chamber and encompassing a segment of the peripheral portion of the first member. The skimming means slidably engages the opposite side surfaces of the first member and removes therefrom fluid carried thereon and diverts same through the cavity and into the first fluid reservoir only when the first member is rotating in one direction relative to the second member. A thermal responsive valve is mounted on the second member and controls the opening and closing of the port which interconnects the first and second fluid reservoirs. Opening of the port occurs only when the valve is subjected to predetermined temperatures.

DESCRIPTION

For a more complete understanding of the invention reference should be made to the drawings wherein:

FIG. 1 is an enlarged fragmentary sectional view of one form of the improved fluid drive coupling; the section being taken axially through the axis of rotation of the first and second members of the coupling.

FIG. 1a is similar to FIG. 1 but showing the thermal responsive valve in a port opening position wherein the first and second fluid reservoirs are interconnected.

FIG. 4 is a fragmentary sectional view taken along line 4—4 of FIG. 1a.

Figures 1, 1A, 4:
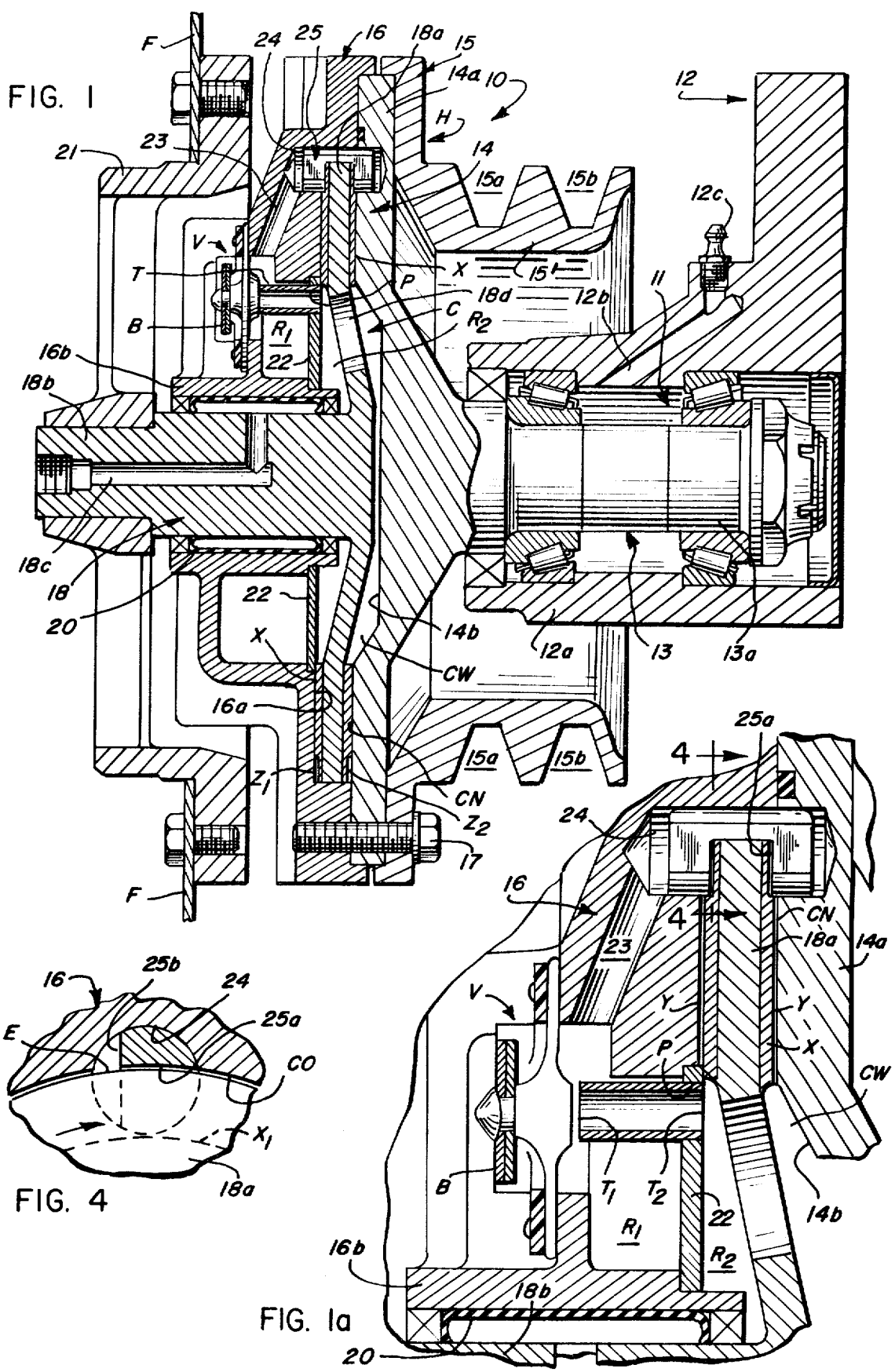

Referring now to the drawings and more particularly to FIGS. 1 and 1a, one form of the improved fluid drive coupling 10 is shown which is adapted for use as a means for coupling and uncoupling an external fan commonly utilized in an internal combustion engine for a motor vehicle or the like. It should be noted however that the coupling 10 is not intended to be limited to such an installation.

The coupling 10, when utilized as a fan drive coupling, is normally positioned behind a radiator, not shown, and is supported by a suitable bearing 11 disposed within a sleevelike projection 12a formed at the front end of the engine block 12. Accommodated within the bearing 11 is one end 13a of a shaft 13. The opposite end of the shaft is provided with a radially extending disc-shaped flange 14. The outer peripheral segment 14a of the flange is offset forwardly a small amount in an endwise direction relative to the inner central segment 14b of the flange. The reason for such configuration of the flange will become apparent from the description hereinafter.

The outer periphery of flange segment 14a is sandwiched between a pair of complemental units 15 and 16 and is secured thereto by a plurality of symmetrically arranged fasteners 17, see FIG. 1. Unit 15 is provided with a sleevelike portion 15' the exterior of which has formed therein spaced, annular grooves 15a, 15b for accommodating conventional drive belts, not shown. In the illustrated embodiment, unit portion 15' at least partially encompasses sleevelike projection 12a.

Units 15 and 16, flange 14, and shaft 13 coact to form a clutch housing assembly, sometimes referred to hereinafter as a housing member H.

A substantial portion of the interior surface 16a of unit 16 coacts with a corresponding opposed portion of the interior surface of flange 14 to form an annular chamber C. Chamber C, in turn, is formed into a narrow outer drive section CN and a wider inner section CW; said sections being in continuous communication with one another.

Rotatably mounted within chamber C is a clutch member 18 which includes an annular platelike member 18a and a shaft section 18b extending axially from one side thereof. The shaft section 18b is accommodated within a sleeve portion 16b forming a part of the unit 16. Disposed within sleeve portion 16b is a suitable bushing 20. Shrunk fit on or otherwise secured to the distal end of shaft section 18b is an adapter piece 21 to which a plurality of symmetrically arranged fan blades F are secured.

As will be observed in FIG. 1, the inner section CW of chamber C, disposed to one side of the platelike member 18a, is separated into first and second fluid reservoirs $R_1$ and $R_2$, respectively, by a partition 22 which is carried by unit 16 and rotates therewith. Partition 22 is provided with a central opening which snugly encompasses the inner end of sleeve portion 16b. In addition to the central opening, partition 22 is provided with a port P in which may be disposed a piece of tubing T. One end $T_1$ of the tubing terminates in the reservoir $R_1$ and the opposite end $T_2$ thereof terminates in reservoir $R_2$.

Positioned at the end $T_1$ of the tubing is a thermal responsive valve V which is affixed to housing unit 16 and rotates therewith. Reservoir $R_1$ is in communication with reservoir $R_2$ only when valve V assumes an open position with respect to the tubing end $T_1$, see FIG. 1a. Relative movement of valve V with respect to the tubing end $T_1$ may be effected by a bimetal component B forming a part of the valve.

Communicating with reservoir $R_1$ is an internal passage 23 formed in unit 16. The passage extends generally radially outwardly from reservoir $R_1$ to a cylindrically shaped cavity 24, the latter being disposed adjacent to and in communication with a peripheral segment of the chamber drive section CN. The longitudinal axis of cavity 24 is substantially parallel to the rotary axis of member 18. Portions of cavity 24 protrude axially a substantial distance in opposite directions from chamber drive section CN.

Located within cavity 24 is an elongated plug 25 which functions as a skimming means for the viscous fluid which adheres to the opposing outer peripheral surfaces of the platelike member 18a, when there is relative rotation between members H and 18, as will be described more fully hereinafter.

Annular platelike member 18 has bonded to the opposite surfaces thereof a suitable bearing material X (e.g., aluminum). The thickness of the bearing material is such that a narrow passage Y will normally be formed on each side of the platelike member 18a between the exposed surface of the material X and the adjacent surface of the housing member H. Disposed within each narrow passage Y is a film of viscous fluid. During relative rotation of members H and 18, the fluid which has accummulated in reservoir $R_2$ will flow, due to centrifugal force, from the reservoir $R_2$ through passage Y into cavity 24 and from cavity 24 through internal passage 23 to reservoir $R_1$. Because of the viscosity of the fluid and the narrowness of passages Y, the rate of flow through the passages Y will be slow. As the amount of fluid in reservoir $R_2$ is depleted, the amount of fluid within passages Y wll also be reduced with the result that the coupling effect between members H and 18 will be lessened and slippage between the two members will occur. Accordingly, the rotational speed of the fan blades F will be reduced until the temperature surrounding valve V increases to a certain point whereupon the valve V will assume an open position (FIG. 1a) and fluid from reservoir $R_1$ will replenish the fluid depleted from reservoir $R_2$.

Figure 2:
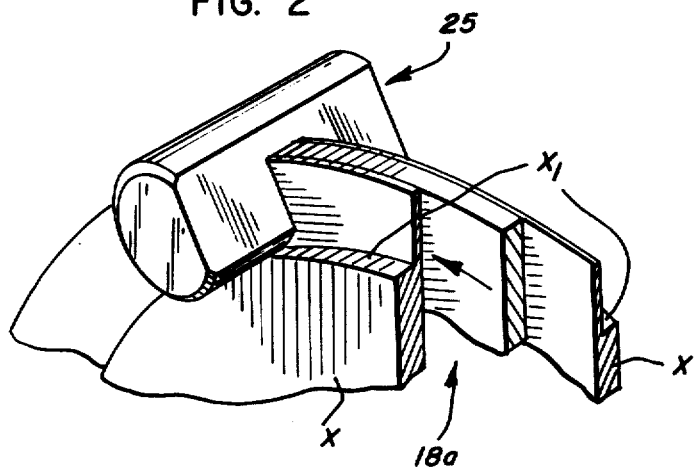
FIG. 2 is a fragmentary perspective view showing the skimming means, embodied in the coupling of FIG. 1, coacting with the outer peripheral portions of the platelike first member whereby fluid carried by the latter is removed therefrom and diverted to the first fluid reservoir of the coupling.
Figure 3:
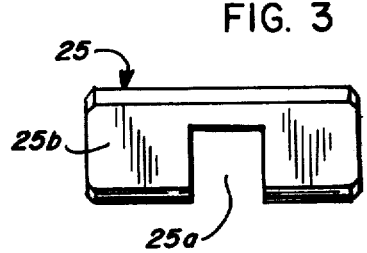
FIG. 3 is a front elevational view of the skimming means shown in FIG. 2.

Plug 25 is sized relative to cavity 24 so that a slip fit is maintained. The plug 25 has formed centrally thereof, a slot 25a which is open on three sides thereof and is shaped to conform substantially to the outer peripheral configuration of platelike member 18a, see FIGS. 2 and 4. It will be noted in FIG. 2 that the outer peripheral portions of the exposed surfaces of the material X, bonded to the opposing surfaces of member 18, are each provided with an annular step or recess $X_1$. An advantage of the steps is that the portions thereof, when not disposed within the plug slot 25a, coact with adjacent surfaces of member H and form annular pockets $Z_1$, $Z_2$, see FIG. 1, in which the fluid will accumulate prior to being diverted by the plug 25 into cavity 24.

To accomplish diversion of the fluid accumulated in pockets $Z_1$, $Z_2$ into the cavity 24, the exterior of the plug 25 is provided with an elongated facet 25b which extends longitudinally in opposite directions from the slot 25a to the ends of the plug. The facet 25b is disposed in opposed relation to the rotating member 18a and, thus, produces a damming effect as to the fluid which adheres to the surfaces of the bonded material X, contacted by the portions of the plug circumjacent the slot 25a and, thus, increases the pressure exerted on the fluid accommodated in cavity 24, to cause same to flow from the cavity into reservoir $R_1$.

It will be noted in FIGS. 1, 1a that the length of plug 25 is less than the length of cavity 24; thus, if there is any axial play between members H and 18 during rotation thereof, the plug and member 18 can move as a unit without adversely effecting the fluid skimming action between the plug and the platelike member 18a.

As seen in FIG. 4, the depth of the slot 25a is such that the fluid which adheres to the outer curved edge E of member 18a will be skimmed therefrom as the outer peripheral portion of member 18a passes through the slot.

Figure 5:
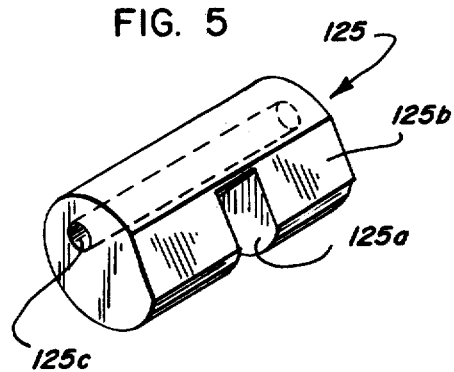
FIGS. 5 and 6 are perspective views of modified forms of skimming means.
Figure 6:
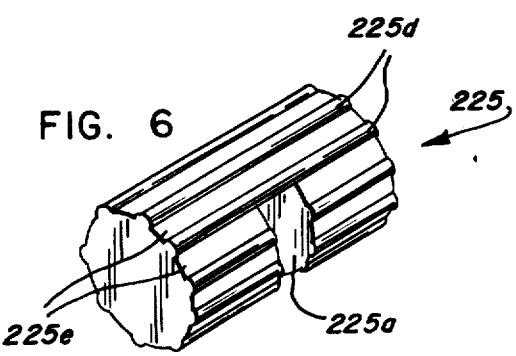

Various modified forms of plugs 125, 225 are shown in FIGS. 5 and 6, respectively. Plug 125 has a configuration similar to that of plug 25, except an elongated internal duct 25c is formed therein which extends the entire length of the plug and, thus, interconnects opposite ends of cavity 24 and prevents entrapment of the skimmed fluid in the right-hand end of the cavity 24, as viewed in FIGS. 1, 1a. The portions of plug 125 corresponding to similar portions of plug 25 are identified by the same numbers except in a 100 series.

Plug 225 is provided with a central slot 225a for accommodating the outer peripheral portion of member 18a. In lieu of the facet 25b provided in plug 25 or 125, plug 225 is provided with a plurality of elongated symmetrically arranged ribs 225d which are in slip fit engagements with the surface of cavity 24. The segments, or valleys, 225e formed on the exterior of plug 225 and disposed intermediate the ribs 225d are recessed from the surface of the cavity engaged by the ribs and, thus, serve to interconnect opposite ends of the cavity. The exterior surface configuration of the plug may vary from that shown without departing from the scope of the invention.

To effect proper lubrication between the shaft section 18b and the bushing 20, the shaft section 18b may be provided with an elongated internal passage 18c through which oil under pressure flows. In a similar manner, bearing 11 for shaft 13 may be properly lubricated by lubricant flowing through an internal passage 12b formed in the projection 12a of the engine block 12. A stopper 12c may be threaded into the exposed end of passage 12b, as seen in FIG. 1. A similar fitting, not shown, may be threaded into the exposed end of passage 18c.

As will be noted in FIG. 1, the platelike member 18a is provided with a plurality of openings 18d which provide interconnection between the portions of inner section CW of the chamber disposed on opposite sides of member 18a. Furthermore, because of the recess of the surface of the center segment 14b of flange 14, clearance is provided between the inner end of shaft section 18b and the flange surface 14b and, thus, enables fluid to fill such clearance, see FIG. 1.

Thus, it will be seen that a fluid coupling has been provided which is of simple design, effective in maintaining the proper coupling relation between the rotating members, and provides proper skimming action between the plug and the outer periphery of the platelike member without causing unbalancing of the latter.

We claim:

1. A fluid drive coupling comprising a rotary mounted platelike first member; a rotary mounted second member provided with a chamber accommodating said first member, said members being rotatable about a common axis and one of said members being adapted to have an external driving force applied thereto, said chamber including an annular fluid drive section having surfaces thereof in close proximity to substantial outer opposite surface portions of said first member, and an inner section having surfaces thereof spaced axially a substantial distance from opposite sides of said first member, the inner section of said chamber disposed axially to one side of said first member being formed into first and second fluid reservoirs interconnected to one another only through a port; a thermal responsive valve mounted on said second member and rotatable therewith, said valve being operatively connected to said port and effecting opening thereof when said valve is subjected to predetermined temperatures; and elongated fluid skimming means mounted for slidable axial movement within an elongated cavity formed in said second member, said cavity having a first portion in communication with a predetermined peripheral segment of said chamber drive section and a second portion in communication with said first reservoir, said skimming means having a segment thereof protruding into said chamber drive section and encompassing a peripheral portion of said first member, said skimming means being adapted to slidably engage opposing surfaces of said first member peripheral portion to remove fluid carried on the surfaces thereof and to divert said removed fluid from the cavity first portion to said cavity second portion when said first member is rotating in one direction relative to said second member.

2. The fluid drive coupling of claim 1 wherein said skimming means includes an elongated plug disposed in slip fit relation with respect to said cavity, said plug being provided with a transversely extending slot disposed intermediate the ends thereof and having an entry end, an exit end and opposing surfaces interconnecting said slot ends and in sliding engagement with opposing side surfaces of said first member when the latter is rotating in one direction relative to said second member, said plug having exterior portions adjacent said slot entry end extending longitudinally therefrom in opposite directions and disposed in spaced relation with respect to a surface of said cavity whereby the removed fluid will be diverted longitudinally of the plug to the second portion of the cavity.

3. The fluid drive coupling of claim 1 wherein the second member is adapted to be rotated by an external driving force applied thereto.

4. The fluid drive coupling of claim 1 wherein axial movement of said skimming means within said cavity reflects any relative axial movement between said first and second members.

5. The fluid drive coupling of claim 1 wherein fluid moves from the inner section through the driving section of the chamber to the cavity during relative rotational movement between said first and second members.

6. The fluid drive coupling of claim 2 wherein said plug has a generally cylindrical exterior configuration except for a facetted portion extending longitudinally in opposite directions from the entry end of said slot.

7. The fluid drive coupling of claim 3 wherein the first member includes an exterior segment on which a plurality of symmetrically arranged fan blades are mounted.

8. The fluid drive coupling of claim 2 wherein said elongated plug extends longitudinally a substantially equal amount from opposite sides of said slot.

9. The fluid drive coupling of claim 8 wherein said cavity has a substantially greater longitudinal dimension than said plug whereby a fluid pocket is formed at each end of said plug and said pockets are in continuous communication with one another.

10. The fluid drive coupling of claim 9 wherein one of said pockets is in communication with said cavity second portion.

* * * * *